United States Patent [19]

Edwards et al.

[11] 4,316,667
[45] Feb. 23, 1982

[54] COPIER AND RECIRCULATING DOCUMENT FEEDER

[75] Inventors: Earl G. Edwards, Boulder; Jerry T. Robinson, Longmont; Bernard L. Wilzbach, Berthoud, all of Colo.

[73] Assignee: International Business Machines Corporation, Armonk, N.Y.

[21] Appl. No.: 122,164

[22] Filed: Feb. 19, 1980

[51] Int. Cl.$^3$ ............................................. G03G 15/00
[52] U.S. Cl. ................................. 355/3 SH; 271/236; 271/250; 271/301
[58] Field of Search ............... 355/3 R, 3 SH, 14 SH; 271/3, 245, 246, 248, 250, 251, 301, 236

[56] References Cited

U.S. PATENT DOCUMENTS

| | | | |
|---|---|---|---|
| 3,343,450 | 9/1967 | Glaser et al. | 88/24 |
| 3,409,366 | 11/1968 | Hanson et al. | 271/301 X |
| 3,709,596 | 1/1973 | Ulmer | 355/109 |
| 3,754,826 | 8/1973 | Kobayashi et al. | 355/109 |
| 3,770,348 | 11/1973 | Martin | 271/301 X |
| 3,840,223 | 10/1974 | Nakata | 271/250 |
| 3,900,192 | 8/1975 | Gibson | 271/3.1 |
| 3,908,986 | 9/1975 | Bleau | 271/251 X |
| 4,147,339 | 4/1979 | Shiina | 271/251 X |
| 4,162,786 | 7/1979 | Bullock | 271/251 X |

Primary Examiner—Fred L. Braun
Attorney, Agent, or Firm—Francis A. Sirr

[57] ABSTRACT

A moving-document copier wherein a loop-shaped path is used to recirculate a document once for each requested copy, the recirculation path having a skewed turn-around guide which intentionally skews the document's leading edge during recirculation, to avoid document jams. The document is subsequently realigned for rescanning to make another copy. A copy-request counter operates to pivot the skewed turn-around guide to a document-intercept position so long as more copies are needed. When all requested copies have been imaged, the document is allowed to proceed to an exit tray.

11 Claims, 7 Drawing Figures

COPIER AND RECIRCULATING DOCUMENT FEEDER

DESCRIPTION

1 Technical Field

The present invention pertains to the field of paper sheet feeding, and more particularly to recirculating a sheet of paper through a generally loop-shaped path, as in a moving-document copier where an original document moves through a stationary scanning station once for each copy which is to be made of the document.

2 Background of the Invention

Recirculating paper paths which recirculate a sheet of paper, such as in the aforementioned moving-document copier, are of course well known. It is also well known that document registration must be accurately maintained as the original document resides in or passes through the scanning station. More specifically, the scanning station usually comprises a linear viewing slot which extends normal to the direction of document movement. One of the document's side edges (assuming a rectangular document) is usually registered against a stationary reference surface which extends parallel to the direction of document movement. This surface operates to maintain the document at a known position during scanning.

In such a recirculating paper path the document must be accurately registered for each pass through the scanning station.

Of course, reliable document feed requires very few document jams as documents pass through the recirculating paper path. U.S. Pat. No. 3,709,596 is an example of such a device. In this device side-registration is maintained through substantially the entire recirculation path. If the side registration surface means contains undesirable discontinuities, jams may occur.

U.S. Pat. No. 3,754,826 is another example of such a device. Here paper sensing switches sense the alignment of the original document, and operate to change the length of one side of the document's drive belt means in order to maintain alignment. Side registration, if accomplished by this device, would be subject to jams if the registration surface undesirably contained discontinuities.

In the more generic field of sheet feeding, U.S. Pat. No. 3,900,192 recognizes the possibility of jams against a side-register sheet guide, and feeds sheets into a duplex tray whose rear wall is at an oblique angle to the direction of sheet travel. As a result, sheets are subsequently fed out of the duplex tray (for side-two copying) with intentionally misregistration of the edge which must subsequently be accurately side registered at the transfer station.

U.S. Pat. No. 3,343,450 also shows a copier having a recirculating document feed. Photocells are provided to detect skew of the original document and to effect correcting movement of the document. In some embodiments, an excessively skewed document which is intended for multiple copying is ejected as if only one copy was requested. This copier is intentionally constructed to impart document skew in one direction as the document passes through its feed path. Thus, the means to correct document skew need operate only in the opposite direction, rather than have the capability of operating in both directions. Since this intentional skew will accumulate and become larger and larger as the document recirculates, a turn-around guide is solenoid-adjustable such that this guide may be pivoted about one end. In its pivoted position, this guide produces a document skew which is opposite to the skew intentionally imparted to the document by the various document engaging guides and roller parts. Specifically, this guide, in its pivoted position, is capable of imparting an opposing skew equal to twice the intentional skew imparted to the document during one pass through the document path. Photocells sense a document's actual skew and control the turn-around guide's position.

SUMMARY OF THE INVENTION

The present invention provides a copier and a recirculating document feeder of the type which moves an accurately registered document through a scanning station to thereby form a flowing line-image of the document on a precharged, moving photoconductor, for example a photoconductor drum.

The document feeder's entry station includes a resilient, cupped drive roller which transports an original document in the direction of feed, to register the document's leading edge against a closed gate, and also transports the document laterally to register its side edge against a fixed-position registration guide surface. This registration guide extends substantially the full extent of the document's recirculation path which will be used when multiple copies are requested by the operator. At a time determined by the position of the photoconductor drum, the gate opens, and the original document is transported along a substantially flat plane which includes the copier's imaging station. Thereafter, and while a trailing portion of the document still resides in the imaging station, the document's leading edge encounters a turn-around guide.

This turn-around guide is operable only when multiple copies of the original document are requested.

It has been found that the circumstance most likely to cause a jam will occur at the corner of the document's leading edge which is adjacent the reference edge, and when this corner passes through the turn-around guide. In order to minimize this condition, the above-mentioned turn-around guide, in the form of a partial cylinder, has its cylindrical axis skewed in a direction such that this corner of the document moves a shorter distance while passing through the guide than does the remaining portion of the document's leading edge. As a result, this corner is pulled away from the registration edge, without introducing a force on the document so as to disturb registration of the trailing portion of the document which is still in the imaging station.

After such skewing, the document continues being driven in a flat elevated plane, and in the direction of sheet feeding, i.e. a direction normal to the direction along which the linear viewing station lies. When the document's leading edge leaves the turn-around guide, it is brought under the influence of drive rollers which produce a sheet drive component in a direction parallel to the reference edge. The document's leading edge next encounters a second, non-skewed turn-around guide. The document then reenters the original portion of its path, and again comes under the aligning influence of the cupped drive roller.

The pivotal position of the skewed turn-around guide, about its cylindrical axis, is controlled by a copy-request counter. When multiple copies are requested, this guide is pivoted to intercept the document's leading edge, as above described. When all copies have been imaged (or if only one copy is requested), this guide is positioned so as not to intercept the document's leading edge. As a result, the document exits to an exit tray.

The foregoing and other features of this invention, as well as its advantages and applications, will be apparent from the following detailed description of the preferred embodiments which are illustrated in the accompanying drawing.

DESCRIPTION OF THE PREFERRED EMBODIMENTS

Figure 1:
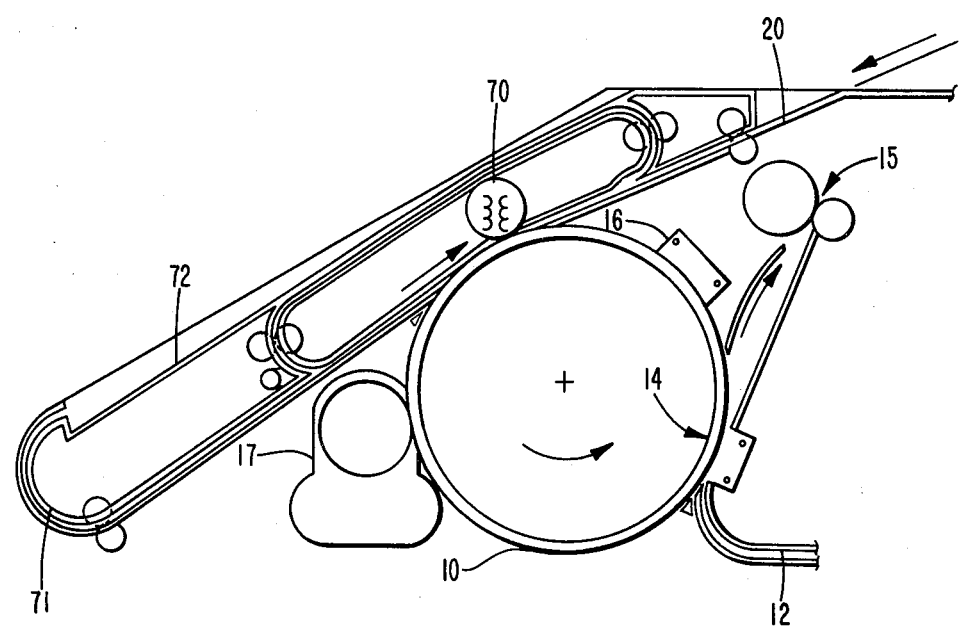
FIG. 1 is a side schematic view of the pertinent portion of a xerographic copier including the present invention in which an original document is back-lighted to form a latent image on a photoconductor drum.
Figure 2:
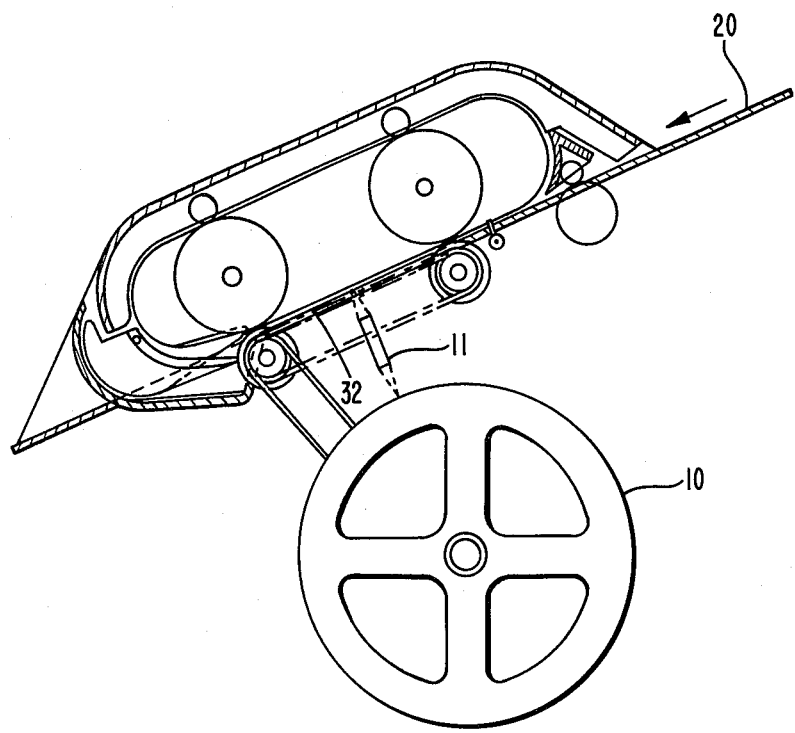
FIG. 2 is a modification of FIG. 1 which provides a linear fiber optic array to facilitate front-lighting of the original document.

The present invention finds utility in various copier configurations. FIGS. 1 and 2 are exemplary. In FIG. 1 the copier is configured to backlight an original document; that is, light passes through the original document from its back or non-image side to cause the image on its front side to be formed as a wrong-reading electrostatic latent image on photoconductor drum 10. In FIG. 2, light shines on the front side of the document and reflects off the document, passing through linear fiber optic array 11, to form a latent image on photoconductor 10.

The paper path as shown in FIG. 1 comprises input 12, transfer corona station 14 and hot roll fuser 15.

The copies of FIGS. 1 and 2 are two-cycle copiers wherein two revolutions of photoconductor 10 are required to form one copy. As such, a transfer corona performs the dual function of precharge/transfer on different drum cycles, and corona 16 performs the dual function of final-charge/preclean-charge on different drum cycles. Magnetic brush developer 17 is also a dual function device since it tones or developes the photoconductor's latent image on one drum cycle, and cleans the photoconductor of residual toner on the next drum cycle.

Two cycle copiers of this type are well known to those of skill in the art.

The copiers of FIGS. 1 and 2 operate in accordance with the well known moving document principle whereby an original document is moved through a stationary imaging slot or station at the speed of drum 10 in order to produce a flowing line-image of the document on the photoconductor. When multiple copies of a document are requested, the document is recirculated past the imaging station once for each copy. When all copies have been imaged, the original document exits to an exit tray. The original document is placed in an entry tray with the side-to-be-copied facing down, and exits with this side facing up.

With reference to FIGS. 3, 4, 5 and 5A, reference numeral 20 identifies an entry tray on which the operator manually positions an original document, rear edge referenced. The vertical plane of rear edge reference is established by plastic member 50, and is the plane of surface 55 shown in FIG. 5.

Assuming the document to be $8\frac{1}{2} \times 11$ inch letter size, the document's leading $8\frac{1}{2}$ inch edge is inserted into gap 21, and in so doing switch 22 senses the presence of the document and causes clockwise movement of drive belt 23 by virtue of drive means, not shown but well known to those of skill in the art. This drive movement causes shafts 24 and 25 to be driven accordingly. Shaft 24 supports conventional drive rollers 26 and 31, as well as a cupped roller 27. Driven roller 31 cooperates with idler roller 28 to form a sheet drive nip. Roller 26 is provided with a similar idler roller. The sheet drive force generated by these two nips is parallel to the document feeder's reference edge and is normal to the axis of shaft 24. Cupped roller 27 cooperates with the surface of metallic entry tray 20 to produce a sheet drive force which is skewed toward the reference edge, i.e., a sheet drive force having a component normal to the axis of shaft 24, as well as a component parallel to shaft 24. As a result, such a document placed on entry tray 20 is automatically aligned with its leading $8\frac{1}{2}$ inch edge against now-closed paper gate 29, and with its rear 11 inch edge against the document feeder's reference edge. Gate 29 is a metal member having a plurality of aligned fingers penetrating entry tray 20 and establishing a gate which is parallel to shaft 24 and parallel to the imaging station established by fiber optic array 11 and document glass 32.

The copy cycle may now begin. Since photoconductor 10 must always be in the same given position, in its counterclockwise rotation, at the beginning of a copy cycle, the drum's position becomes the command parameter for opening gate 29. As is well known, this can be accomplished mechanically, as by cam means, or electrically, as by a drum position transducer and logic or microcomputer control of an electromechanical actuator which produces counterclockwise rotation of the paper gate's mounting shaft 30. In the embodiment shown, an electrical means in the form of a solenoid produces this rotation to open gate 29 to its FIG. 3 dotted line position. Once gate 29 opens, the document proceeds over document glass 32 whereat linear fluorescent lamps 33 and 34 operate to illuminate a line portion of the moving document. Light is thus reflected off the moving document and passes down through linear fiber optic array 11 to produce a flowing image of the document on rotating photoconductor drum 10.

Figure 3:
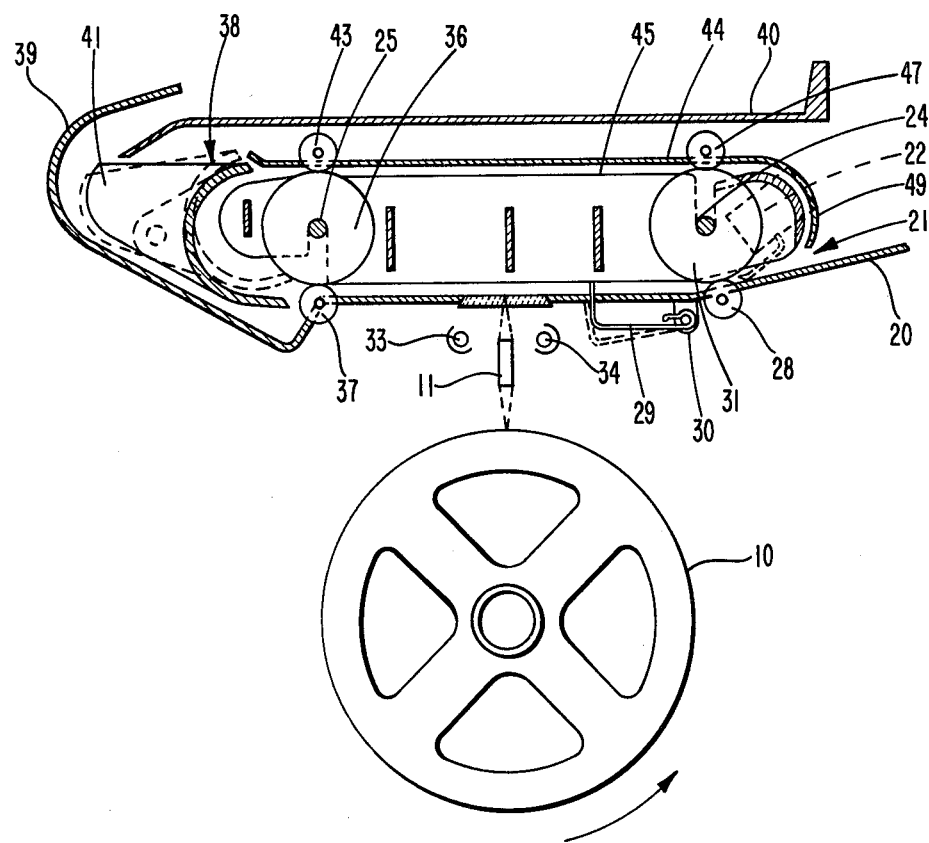
FIG. 3 is a view like FIG. 2, showing the document feeder in greater detail.

When the document's leading edge has moved approximately four inches beyond now-open gate 29, it comes into the driving influence of the drive nip formed by driven rollers 35 and 36 and their cooperating idler rollers. Roller 36's idler roller 37 is shown in FIG. 3. Shafts 24 and 25 are parallel and are spaced approximately 5 inches apart; thus it is seen that a letter size document spans the distance between these two document drive means, as an intermediate portion of the document is passing through the imaging station comprised of document glass 32.

Shortly thereafter, and while a trailing portion of the document remains at the imaging station, the sheet's leading edge encounters the general location of skewed turn-around guide 38. At this point, the document will be diverted to one of two paths, depending upon the need to make more than one copy.

Figure 4:
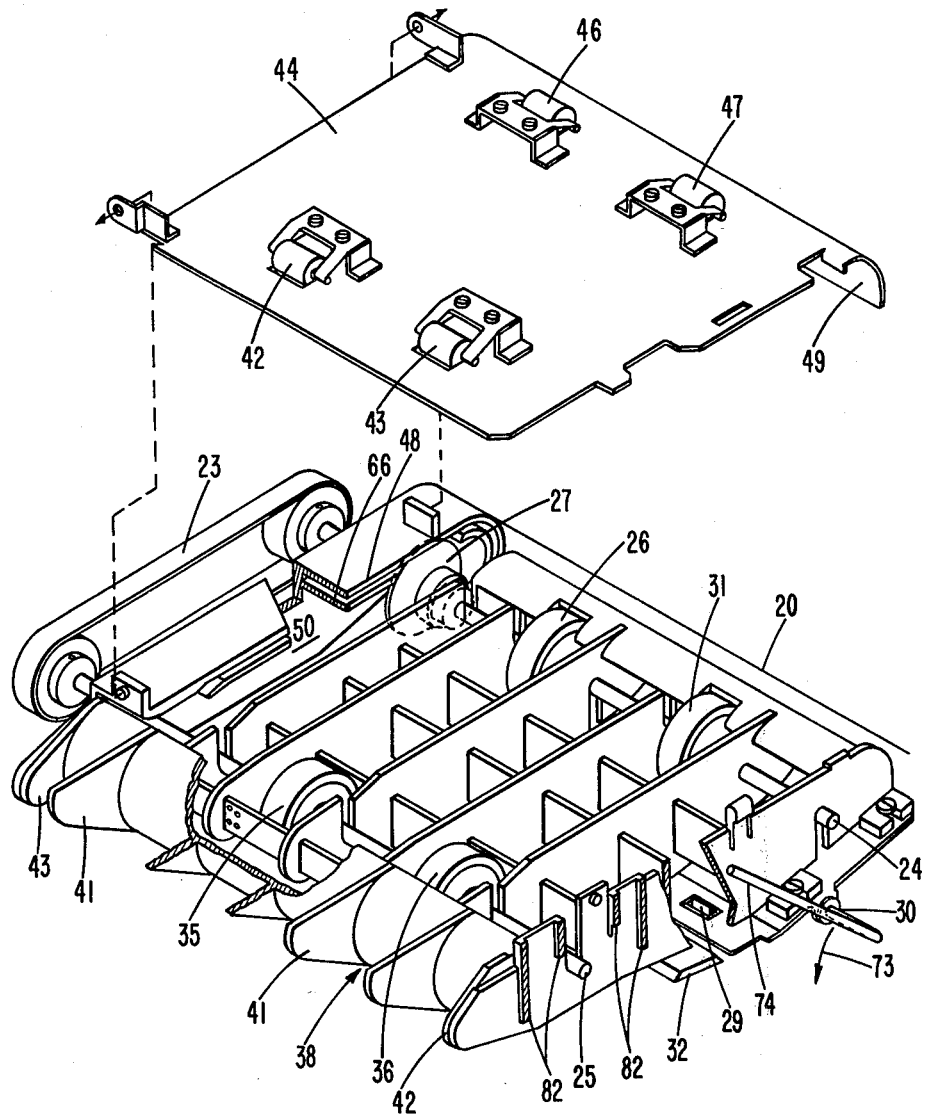
FIG. 4 is a top perspective view of the document feeder of FIG. 3, showing the feeder's cover exploded.

Considering first the one-copy request situation, guide 38 in this situation is pivoted to its FIG. 3 dotted line position. As a result, the document's leading edge continues to a further turn-around guide 39 whereat it is directed up into original document exit tray 40. As best seen in FIG. 4, guide 38 includes a plurality of extending ribs 41 which cooperate with guide 39 to define this exit path for the document. In the event that more copies than one have been requested by the operator, guide 38 is positioned in its FIG. 3 full line position. In this position, the document's leading edge is intercepted and diverted upwardly to the upper, flat run of the document feeder's loop-shaped recirculating path.

Considering guide 38 in greater detail, this guide is formed as in approximately 180° portion of a circular cylinder whose axis is not parallel to axes 24, 25. More specifically, this cylindrical axis is spaced closer to shaft 25 at the end adjacent reference edge member 50 than it is at the other end. These two ends are to the left and right, respectively, in FIG. 4. This skewing of guide is not great. In an exemplary construction, guide 38 was 8.7 inches long, as measured between the two end ribs 42 and 43, and yet the cylindrical axis at end 42 was spaced only 0.125 inch farther from shaft 25 than it was spaced from this shaft at end 43. It will be noted that as a result of this skewing, rub 43 is longer than rib 42, and all ribs are progressively shorter as they are progressively viewed in the direction 43 toward 42.

Guide 38, which is preferably formed of a plastic material, is hinged at its ribs 42 and 43 on an axis which is parallel to shaft 25, and thus parallel to the leading edge of an advancing document. As this leading edge encounters guide 38, its rear leading corner will be the first point on the leading edge to encounter the guide's concave turn-around surface. As a result, this corner of the document begins its upward path, and in so doing, this corner experiences a component of movement which is parallel to the guide's cylindrical axes, and in a direction away from rib 43. At the instant that the document's entire leading edge resides within guide 38's cylindrical surface, the leading edge is now skewed to the axis defined by shaft 25, and is skewed therefrom in the same direction as the guide's cylindrical axis is skewed therefrom. As a result, the left-hand corner of the document's leading edge (as viewed in FIG. 4) travels a shorter distance during 180° turnaround than does the right-hand corner of this edge.

Thus, the left-hand corner is pulled away from the plane 55 of document registration, and the likelihood of document jam is greatly minimized.

The leading edge of the document is next brought into the driving influence of the top portion of driven rollers 35 and 36, as these rollers cooperate with idler rollers 42 and 43. Rollers 42 and 43 are spring loaded against rollers 35 and 36 by virtue of leaf springs which mount rollers 42 and 43 to metal cover 44. Cover 44 is hinged to the plastic member 50 which forms the reference edge, as best shown in FIG. 4. The document-path spacing of the upper and lower drive nips formed by the upper and lower surfaces of rollers 35 and 36 is such that spaced portions of the document are simultaneously in the driving influence of all of these drive nips. However, the portion of the document in the upper nips is skewed, whereas the portion of the document in the lower nips is not.

The document continues to be driven through the upper run 45 of the loop-shaped path, until its leading edge encounters the driving influence of the upper portion of driven rollers 26 and 31, and the upper portion of cupped roller 27. Rollers 26 and 31 form a drive nip with cover-mounted, and spring biased idler rollers 46 and 47. Cupped roller 27 forms a drive nip with portion 48 of member 50 which establishes the reference edge. As a result, the skewed leading edge of the document now comes under the realigning influence of cupped roller 27, and a document drive force now begins to effect realignment of the document's leading edge.

During such realignment, the document's leading edge encounters non-skewed turn-around guide 49 formed in cover 44, and the document re-enters entry tray 20 whereat its presence is sensed by switch 22. By the time the document's leading edge has reached now-closed gate 29, the document has been realigned to the rear reference edge, and the document awaits the drum position, during another copy cycle, when its presence is needed at the copier's imaging station.

Figure 5:
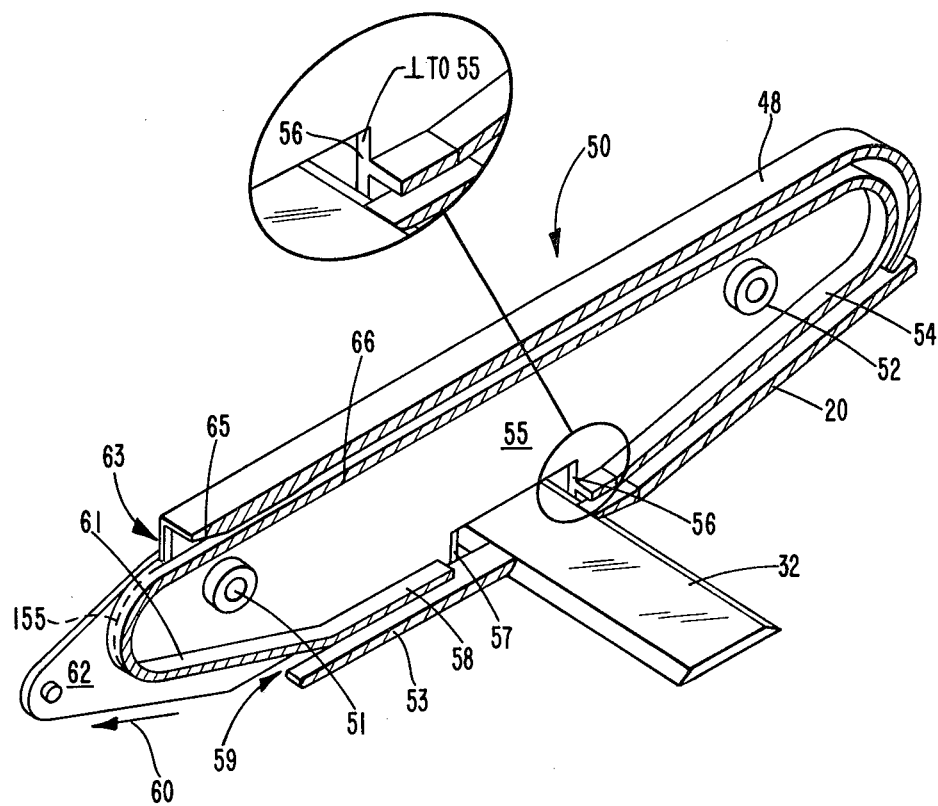
FIGS. 5 and 5A show the structural member of the FIG. 4 device which contains the loop-shaped registration edge against which the side edge of a document is registered during recirculation.
Figure 5A:
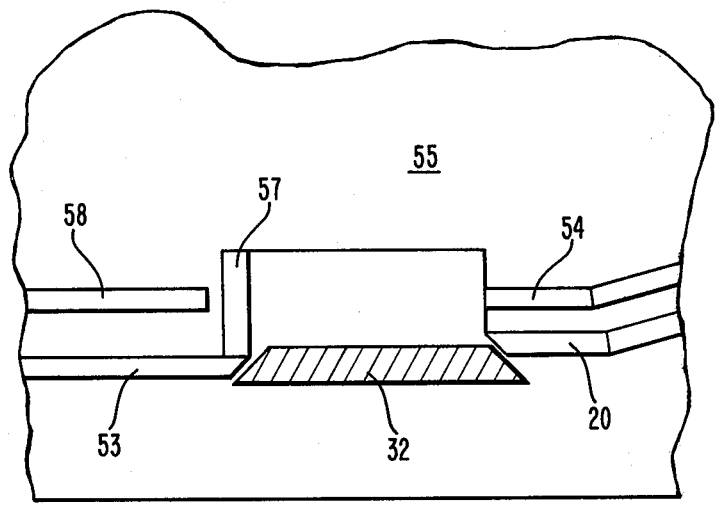

FIGS. 5 and 5A show member 50 of FIG. 4. In FIG. 5, certain wall portions are broken away to more clearly show the vertical plane 55 of the document's reference edge. Member 50 is preferably formed of plastic and includes extending bosses 51 and 52 which rotatably receive shafts 25 and 24, respectively. Entry tray 20 cooperates with platen 32 and flat wall 53 to establish the lower guiding surface for a document. The document's rear longitudinal edge is first received in the channel formed by entry tray 20 and the horizontal portion 54 of a wall extending a short distance from the vertical document referencing plane defined by surface 55. As the document's leading rear corner enters platen 32, wall 55 falls away from this corner by virtue of surface 56 which is perpendicular to wall 55. Thus, the leading corner encounters no occasion for jam as it traverses the platen. On the other side of the platen, an inclined surface 57 reestablishes wall 55 as a reference plane for this corner of the document. Wall 55 extends below horizontal wall portion 58.

As seen in FIG. 5A, entry tray 20 guides the document's leading edge slightly above the top surface of glass 32, whereas the upper surface of wall 53 is spaced slightly below the glass's top surface. Thus, jamming is minimized.

At document path point 59 the document either exits by way of path 60, or recirculates about the skewed turn-around guide, while its inner path is guided by wall portion 61. Vertical wall 62 is not in the same plane as wall 55. Dotted line 155 represents the intersection of the plane of wall 55 with the wall portion 61. This line is parallel to, but spaced about 0.2 inch from wall 62. By the time the above-described document corner has traversed wall portion 61, it has been caused to move out of contact with the vertical plane of wall 55, and thus there is no tendency to jam at document path point 63. The upper guide, including horizontally extending wall 48, nevertheless includes two entry inclined surfaces 65 to guide this portion of the document's leading edge between wall portions 48 and 66.

As the document's leading edge enters the influence of cupped roller 27, at about the position directly above boss 52, the document is again registered to the plane of wall 55.

FIGS. 3, 4, 5 and 5A show the detail of the FIG. 2 document feeder. The document feeder of FIG. 1 is substantially the same, the two differences being the presence of an elongated, tubular light source 70 immediately above the position occupied by glass platen 32 in FIG. 4, and the different positioning of exit turn-around guide 71 and original document exit tray 72 clearly shown in FIG. 1. In both document feeders, a copy request counter, now to be described, cooperates with the feeder's document gate and skewed turn-around guide to produce recirculation of the original document for multiple copy job requests.

Figure 6:
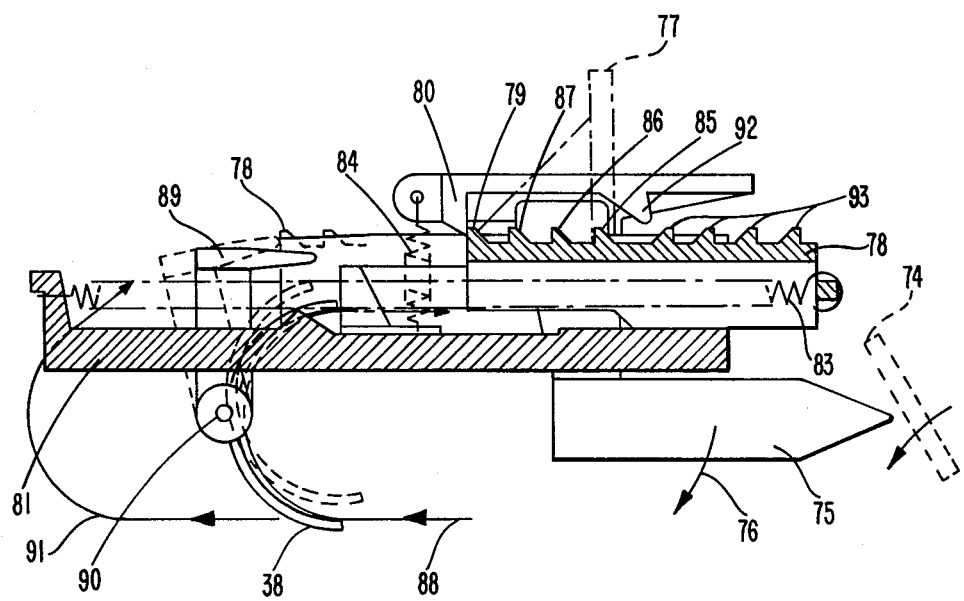
FIG. 6 shows the copy request counter used in FIGS. 1 and 2 to produce recirculation of an original document when multiple copies are requested.

FIG. 6 shows the copy request counter used in FIGS. 1 and 2 to produce recirculation of an original document when multiple copies are requested. While this counter is shown as a mechanical counter, the present invention is not to be restricted thereto. Rather, a variety of counter arrangements can be used to implement the unique function of producing document recirculation and control of skewed turnaround guide 38 between its dotted and full-line positions of FIG. 3.

As has been described, document gate 29 opens as a result of counterclockwise rotation of shaft 30 (FIG. 4). Gate 29 is spring-biased to the FIG. 4 position by spring means, not shown, and opens (see FIG. 4's arrow 73) by virtue of energization of a solenoid, not shown. In so opening, shaft 30 rotates counterclockwise approximately 5°. As a result, FIG. 4's arm extension 74 engages FIG. 6's pivotable plastic member 75 and causes member 75 to pivot clockwise as indicated by arrow 76.

The counter of FIG. 6 is manually set by the operator to a copy count of from "2" to "5" copies by means of a finger lever 77, shown in broken lines. In FIG. 6, lever 77 has been moved to the right to the 5-copy-request position. In so doing, spring-loaded gear rack 78 has been moved such that its tooth 79 is now held against leftward movement by tooth 80 formed in pivotal member 75.

In FIG. 6, reference member 81 represents an extension of the side plate 82 of FIG. 4, and thus member 81 is a stationary member. Spring 83 biases gear rack 78 to the left, and spring 84 biases member 75 for counterclockwise rotation about its axis.

Had a copy request of "2" been selected, the operator would have moved lever 77 to the right only a short distance, until this lever aligned with indicia "2" carried by a stationary plate, not shown. In this condition, tooth 80 cooperates with tooth 85. In a similar fashion, tooth 86 designates "3" copies and tooth 87 designates "4" copies.

When gear rack 78 is at any position other than its extreme left-hand home position, skewed turn-around guide 38 is in its full-line intercept position, and a document follows recirculating path 88. The construction and arrangement of guide 38 is such that the effects of gravity cause the guide to assume its FIG. 6 full-line position (although it can be spring biased) whenever gear rack 78, and spring 83, are not operative to engage a lever 89 which is formed as an integral part of guide 38. The FIG. 6 dotted line position of gear rack 78 and lever 89 show how guide 38 is forced to pivot counterclockwise, about its pivotal axis 90, to its non-intercept position, when all copies have been made, or when only one copy is requested. Note that a "1" copy request is indicated by merely placing a document in entry tray 20 (FIG. 3), and lever 77 is not moved to the right (FIG. 6). When guide 38 is in its non-intercept position, the document follows exit path 91.

As shown, the counter of FIG. 6 is set to a "5" copy request. Every time gate 29 opens (the dotted line position of FIG. 3), arm extension 74 engages member 75, causing member 75 to rotate counterclockwise. In so doing, teeth 80, 79 disengage, and gear rack 78 moves to the left a step-distance determined by the resulting interference between tooth 92 and one of teeth 93. The mechanism now remains in this position until such time as the drum position transducer, previously mentioned but not shown, indicates that the document's trailing edge has cleared now-open gate 29. In actual practice the closing of gate 29 is always set to occur for the longest legal size original document. When gate 29 closes, arm 74 releases member 75, and member 75 pivots clockwise, causing tooth 80 to now engage tooth 87. In this manner, the counter of FIG. 6 steps down one count for each recirculation of the original document through FIG. 3's imaging station.

While preferred embodiments of the invention have been described, it is to be understood that the present invention is not limited to these precise disclosures, and that the invention is defined by the scope of the appended claims.

What is claimed is:

1. A copier and moving document feeder, comprising:
   a document entry station including entry alignment means for aligning a document against a longitudinally extending reference edge and against a laterally extending closed document gate;
   a stationary imaging station, including an extension of said longitudinally extending reference edge, located on the side of said document gate opposite said entry station, for line-scanning an original document moving therepast;
   a skewed turn-around guide formed as a partial cylinder whose cylindrical axis is not perpendicular to said reference edge, so as to cause the leading-edge corner of a document which is adjacent said reference edge extension to traverse a shorter distance while passing through said turn-around guide than does the remainder of the leading edge, to thereby skew the leading edge of such a document without introducing a force which may disturb registration of the portion of the document then remaining in said imaging station;
   a document return path located downstream of said skewed turn-around guide and generally above said imaging station, including a further extension of said longitudinally extending reference edge, and operable to receive such a document having its leading edge now skewed;
   further alignment means located within said document return path and operable to realign such a document against said further extension of the longitudinally extending reference edge after the trailing edge of the document has passed through said imaging station; and
   a nonskewed turn-around guide located downstream of said further alignment means and operable to direct the leading edge of a document into the aligning influence of said entry alignment means and into said document gate after the document's trailing edge has passed through said imaging station.

2. The copier and document feeder defined in claim 1 including a copy request counter, and means operable to control said skewed turn-around guide to intercept the leading edge of a document only when additional copies of the document are requested.

3. The copier and document feeder defined in claim 1 including an exit turn-around guide operable to intercept the leading edge of a document which has not been intercepted by said skewed turn-around guide, and an exit tray located generally above said document return path and operable to receive documents from said exit turn-around guide.

4. The copier and document feeder defined in claim 2 wherein said copy request counter and said document gate are actuated substantially simultaneously, said counter decrementing one count as said gate opens.

5. The copier and document feeder defined in claim 1 including a copy request counter, and means operable to control rotation of said skewed turn-around guide about its cylindrical axis, to thus cause the leading edge of a document to be intercepted only when additional copies of the document are to be made.

6. The copier and document feeder defined in claim 5 wherein said copy request counter and said document gate are actuated at substantially the same time, said counter decrementing one count, and said gate opening.

7. The copier and document feeder defined in claim 6 including a fixed-position exit turn-around guide operable to intercept the leading edge of a document for which all copies have been imaged, and a document exit tray located generally above said document return path operable to receive documents from said exit turn-around guide.

8. The copier and document feeder, comprising:
- a document entry station platform which terminates at a laterally extending, normally closed gate against which the leading edge of a document is registered by virtue of a document drive force supplied by a cup-shaped roller which deforms against said entry station platform in a manner to also side-register a document against a longitudinally extending reference edge;
- a generally flat imaging station platform which views a document moving therethrough, said imaging station platform being an extension of said entry platform, including said longitudinally extending reference edge, and being separated from said entry platform by said gate;
- first document drive roller means mounted at the exit of said imaging station platform, the bottom portion of said first drive roller means being operable to supply longitudinal drive force to a document, the diameter of said first document drive roller means being substantially equal to the diameter of said cup-shaped roller;
- a skewed turn-around guide mounted to receive the leading edge of a document being driven by said first document drive roller means and to deflect the document up and around a 180° turn to an upper generally flat document path which is generally parallel to said imaging station platform, and which includes a further extension of said longitudinally extending reference edge, said skewed turn-around guide being skewed in a direction to cause that leading edge of a document which is adjacent the vertical plane of said reference edge to move away from said plane;
- said imaging station platform and said upper document path being spaced by the diameter of said first document drive roller means such that the upper portion thereof is operable to supply longitudinal drive force to a document resident in said upper document path, and such that the upper portion of said cup-shaped roller subjects the document to a force tending to realign the document to said further extension of said longitudinally extending reference edge as the document exits said upper document path; and
- a non-skewed turn-around guide mounted to receive the leading edge of a document as it emerges from said upper document path, and to direct the document downward around a 180° turn into said entry station platform.

9. The copier and document feeder defined in claim 8 including a second document drive roller means of the same general diameter as said first document drive roller means, and mounted such that its bottom portion provides longitudinal drive to a document at said entry station platform, as its upper portion provides longitudinal drive to a document exiting said upper document path.

10. The copier and document feeder of claim 9 including a copy request counter, wherein said skewed turn-around guide is movable between a first position wherein the leading edge of a document is intercepted, and a second position wherein the leading edge of a document continues traveling in the general plane of said imaging station platform, and means whereby the position of said skewed turn-around guide is controlled by said copy request counter.

11. The copier and document feeder defined in claim 1 including an exit turn-around guide adapted to receive the leading edge of a nondeflected document, and to direct such a document upward approximately 180° to a document exit tray which is mounted generally above said upper document path.

* * * * *

UNITED STATES PATENT AND TRADEMARK OFFICE
CERTIFICATE OF CORRECTION

PATENT NO. : 4,316,667

DATED : February 23, 1982

INVENTOR(S) : Earl G. Edwards, Jerry T. Robinson, Bernard L. Wilzbach

It is certified that error appears in the above—identified patent and that said Letters Patent is hereby corrected as shown below:

Column 3, line 46, "copies" should be --copiers--.

Claim 11, line 47, "1" should be --10--.

Signed and Sealed this

Twenty-fifth Day of May 1982

[SEAL]

Attest:

Attesting Officer

GERALD J. MOSSINGHOFF

Commissioner of Patents and Trademarks